United States Patent [19]

Yoshida et al.

[11] Patent Number: 5,700,853
[45] Date of Patent: Dec. 23, 1997

[54] SILICONE RUBBER COMPOSITIONS

[75] Inventors: Takeo Yoshida; Syuuichi Azechi; Toshio Shiobara, all of Usui-Gun, Japan

[73] Assignee: Shin-Etsu Chemical Co., Ltd., Tokyo, Japan

[21] Appl. No.: 735,504

[22] Filed: Oct. 23, 1996

[30] Foreign Application Priority Data

Oct. 24, 1995 [JP] Japan ................. 7-299070

[51] Int. Cl.$^6$ ........................................ C08K 9/06
[52] U.S. Cl. ........................ 523/212; 523/204; 523/210; 524/493; 524/789
[58] Field of Search ........................ 524/493, 789; 523/204, 210, 212

[56]  References Cited

U.S. PATENT DOCUMENTS

Re. 25,141  3/1962  Wormuth ..................... 524/493
4,962,151  10/1990  Mellon ........................ 524/789
5,492,945  2/1996  Morita et al. ................ 524/493

*Primary Examiner*—Melvyn I. Marquis
*Attorney, Agent, or Firm*—Millen, White, Zelano, & Branigan, P.C.

[57]  ABSTRACT

In a silicone rubber composition comprising (A) an organopolysiloxane of the organic peroxide curing type or addition reaction curing type, (B) a curing agent, and (C) non-spherical silica fine powder, (D) a mixture of 50–95% by weight of spherical fused silica having a mean particle size of 7–40 μm and 50–5% by weight of spherical fused silica having a mean particle size of 0.1–6.5 μm is blended in an amount of 100–900 parts by weight per 100 parts by weight of components (A) and (B) combined. The composition has a low viscosity and high fluidity despite high loading and heat cures into a product having low coefficients of shrinkage and expansion and low water absorption.

15 Claims, No Drawings

SILICONE RUBBER COMPOSITIONS

BACKGROUND OF THE INVENTION

1. Field of the Invention

This invention relates to a silicone rubber composition with a high loading of silica filler and more particularly, to a silicone rubber composition with a high loading of silica filler which has a low viscosity and high fluidity and heat cures into products having low coefficients of shrinkage and expansion, low water absorption and improved filler loading.

2. Prior Art

Silicone rubber has excellent properties including weather resistance, water repellency and electrical insulation although it is a common practice in the art to load silicone rubber with inorganic fillers to impart additional properties. The loading of silicone rubber with inorganic fillers is known effective for improving heat resistance, electrical properties and shrinkage. Particularly when silicone rubber is used as electrical insulators such as insulators utilized with power distribution and transmission lines, silicone rubber must be highly loaded with inorganic fillers for the purpose of improving electrical properties.

Finely divided silica is commonly used as the inorganic filler. As the amount of silica blended increases, the silicone rubber composition increases its viscosity, losing smooth flow. Then not only loading becomes difficult, but also molding is impeded. High loading of finely divided silica is thus almost impossible. Even if possible, the blending step is time consuming and a loss of fluidity prohibits a free choice of molding technique and exacerbates working efficiency.

One possible approach for maintaining flow is to use a filler having a large particle size and a small specific surface area. However, high loading of such a filler has a certain limit. It is difficult to load the filler to a high density.

SUMMARY OF THE INVENTION

An object of the present invention is to provide a silicone rubber composition which can be loaded with silica filler to a high density, which has high fluidity enough to ensure efficient working and molding despite the high loading, and which cures into a silicone rubber product having improved weather resistance and water repellency under service conditions where it is exposed to a seriously contaminated atmosphere or severe weather.

We have found that loading of silica filler in a silicone rubber composition comprising an organopolysiloxane of the organic peroxide curing type or addition reaction curing type and silica fine powder is maximized by blending a mixture of at least two spherical fused silicas having different mean particle sizes, more specifically a spherical fused silica filler comprising (a) 50 to 95% by weight of spherical fused silica having a mean particle size of 7 to 40 µm and (b) 50 to 5% by weight of spherical fused silica having a mean particle size of 0.1 to 6.5 µm. Despite high loading of the spherical fused silica filler, the loaded silicone rubber composition does not lose fluidity and cures into a product having improved weather resistance, low coefficients of shrinkage and expansion, low water absorption, heat resistance and improved electrical insulating properties.

Accordingly, the present invention provides a silicone rubber composition comprising (A) an organopolysiloxane of the organic peroxide curing type or addition reaction curing type, (B) a sufficient amount to cure organopolysiloxane (A) of a curing agent, the amount of components (A) and (B) combined being 100 parts by weight, (C) 1 to 100 parts by weight of a non-spherical silica fine powder, and (D) 100 to 900 parts by weight of a spherical fused silica filler comprising 50 to 95% by weight of spherical fused silica having a mean particle size of 7 to 40 µm and 50 to 5% by weight of spherical fused silica having a mean particle size of 0.1 to 6.5 µm.

DETAILED DESCRIPTION OF THE INVENTION

The silicone rubber composition of the invention is formulated as either the organic peroxide curing type or the addition reaction curing type. In either case, component (A) is an organopolysiloxane which is curable with the curing agent to be described later.

For organopolysiloxane (A), a proper choice may be made among various organopolysiloxanes depending on a particular curing type. In either case, it is preferable to use an alkenyl group-containing organopolysiloxane of the following average compositional formula (1).

$$R^1_a SiO_{(4-a)/2} \tag{1}$$

In formula (1), $R^1$ is a substituted or unsubstituted monovalent hydrocarbon group attached to a silicon atom and having 1 to 10 carbon atoms, preferably 1 to 8 carbon atoms, for example, alkyl groups such as methyl, ethyl, propyl, isopropyl, butyl, isobutyl, tert-butyl, hexyl, octyl, and decyl; cycloalkyl groups such as cyclohexyl; alkenyl groups such as vinyl, allyl, propenyl, isopropenyl, butenyl, isobutenyl, and hexenyl; aryl groups such as phenyl, tolyl and xylyl; aralkyl groups such as benzyl and phenylethyl; and substituted ones of these groups wherein some or all of the hydrogen atoms attached to carbon atoms are replaced by halogen atoms (e.g., chlorine, bromine and fluorine) or cyano groups, such as chloromethyl, bromoethyl, 3-chloropropyl, 3,3,3-trifluoropropyl and cyanoethyl. The groups represented by $R^1$ may be the same or different. It is noted that 0.01 to 20 mol %, preferably 0.1 to 10 mol % of the entire hydrocarbon groups represented by $R^1$ is an alkenyl group. The organopolysiloxane should contain on the average at least two alkenyl groups in a molecule. Among the above-mentioned groups for $R^1$, the preferred alkenyl group is vinyl and the preferred other substituents are methyl and phenyl. Letter a is a positive number of 1.6 to 2.4, preferably 1.9 to 2.3.

Most often the organopolysiloxane is a linear diorganopolysiloxane having a backbone essentially composed of recurring diorganosiloxane units and blocked with a triorganosiloxy group at either end of its molecular chain although branched ones containing $R^1SiO_{3/2}$ and $SiO_{4/2}$ units are also acceptable. It is noted that the alkenyl group may be attached to a silicon atom at either an end or midway of the molecular chain. An organopolysiloxane having at least two alkenyl groups attached to silicon atoms at both ends of the molecular chain is desirable from the standpoints of curing rate and cured properties.

Preferably the alkenyl group containing organopolysiloxane has a viscosity of 100 to 1,000,000 centipoise at 25° C., more preferably 500 to 500,000 centipoise at 25° C.

The organopolysiloxane can be prepared by well-known methods, for example, by effecting equilibration reaction between an organocyclopolysiloxane and a hexaorganodisiloxane in the presence of an alkali or acid catalyst.

Component (B) is a curing agent for curing organopolysiloxane (A). An organic peroxide is used as component (B) where the silicone rubber composition of the invention is formulated to the peroxide curing type. The organic peroxide used herein is not critical insofar as it assists in heat curing the organopolysiloxane into silicone rubber. A choice may be made of conventional well-known organic peroxides. Several illustrative examples of the organic peroxide are given below.

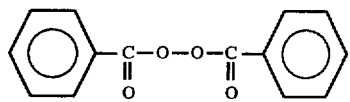

benzoyl peroxide

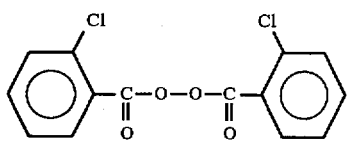

o-monochlorobenzoyl peroxide

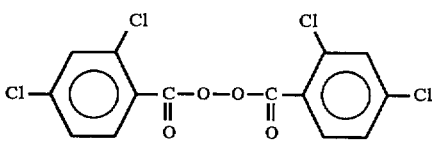

bis-2,4-dichlorobenzoyl peroxide

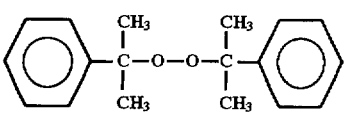

dicumyl peroxide

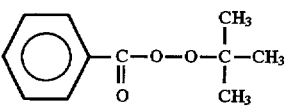

t-butyl benzoate

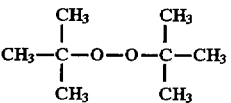

di-t-butyl peroxide

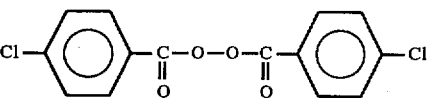

p-monochlorobenzoyl peroxide

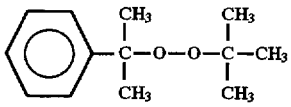

t-butylcumyl peroxide

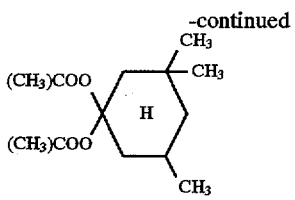

1,1-bis(t-butylperoxy)-3,3,5-trimethylcyclohexane

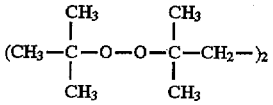

2,5-dimethyl-2,5-bis(t-butylperoxy)hexane

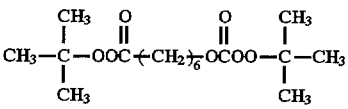

1,6-bis(t-butylperoxycarboxy)hexane

The amount of organic peroxide added is a catalytic amount and may be suitably selected in accordance with a desired curing rate. It is preferably 0.1 to 10 parts by weight, more preferably 0.2 to 3 parts by weight per 100 parts by weight of organopolysiloxane (A).

Where the silicone rubber composition of the invention is formulated to the addition reaction curing type, curing agent (B) is a mixture of (B-1) an organohydrogenpolysiloxane and (B-2) an addition reaction catalyst. Through addition reaction or hydrosilylation reaction taking place between a hydrogen atom attached to a silicon atom (that is, SiH group) in the organohydrogenpolysiloxane as (B-1) and an alkenyl group in the organopolysiloxane as (A), the composition cures into silicone rubber.

The organohydrogenpolysiloxane acts as a crosslinking agent. It is not critical insofar as it contains at least two, preferably at least three SiH groups in a molecule. It may have a linear, branched, cyclic or three-dimensional network molecular structure. Its molecular weight is not critical insofar as it is liquid at room temperature. The preferred organohydrogenpolysiloxane is of the following average compositional formula (2).

$$R^2{}_b H_c SiO_{(4-b-c)/2} \tag{2}$$

In formula (2), $R^2$ is a substituted or unsubstituted monovalent hydrocarbon group having 1 to 10 carbon atoms, preferably 1 to 8 carbon atoms. Examples of this hydrocarbon group are the same as exemplified for $R^1$ although those groups free of aliphatic unsaturation are preferred. Letters b and c are positive numbers satisfying $1 \leq b \leq 2.1$, $0.01 \leq c \leq 1$, and $1.5 \leq b+c \leq 2.8$, preferably $1.1 \leq b \leq 2$, $0.02 \leq c \leq 0.9$, and $1.8 \leq b+c \leq 2.2$. The SiH groups may be attached at any positions including ends and midway of the molecular chain.

Examples of the organohydrogenpolysiloxane include both end trimethylsiloxy-blocked methylhydrogenpolysiloxane, both end trimethylsiloxy-blocked dimethylsiloxane-methylhydrogenpolysiloxane copolymers, both end dimethylhydrogensiloxy-blocked dimethylsiloxane, both end dimethylhydrogenpolysiloxy-blocked dimethylsiloxane-methylhydrogenpolysiloxane copolymers, both end trimethylsiloxy-blocked methylhydrogenpolysiloxane-diphenylsiloxanedimethylsiloxane copolymers, copolymers composed of $(CH_3)_2HSiO_{1/2}$ and $SiO_{4/2}$ units, and copolymers of $(CH_3)_2HSiO_{1/2}$, $SiO_{4/2}$, and $(C_6H_5)SiO_{3/2}$ units.

Preferably organohydrogenpolysiloxane (B-1) is used in such amounts that the molar ratio of the SiH group in prganohydrogenpolysiloxane (B-1) to the alkenyl group in organopolysiloxane (A) may range from 0.5:1 to 3:1. The amount of organohydrogenpolysiloxane (B-1) added is usually 0.1 to 100 parts, preferably 0.3 to 50 parts by weight per 100 parts by weight of organopolysiloxane (A).

The addition reaction catalyst (B-2) which is used in combination with organohydrogenpolysiloxane (B-1) is preferably selected from well-known platinum group metal catalysts. Examples include platinum black, platinic chloride, reaction products of chloroplatinic acid with monohydric alcohols, complexes of chloroplatinic acid with olefins, platinum bisacetoacetate, palladium catalysts, and rhodium catalysts. The amount of addition reaction catalyst added is a catalytic amount which is preferably 0.1 to 500 ppm, especially 1 to 100 ppm of metallic platinum or rhodium based on organopolysiloxane (A).

In the silicone rubber composition of the invention, non-spherical silica fine powder is blended as component (C). The silica fine powder is essential to form silicone rubber having mechanical strength. The type of silica fine powder is not critical insofar as its shape is non-spherical. Any of silica fine powders commonly used in conventional silicone rubber compositions may be used. Preferred examples of the silica fine powder include precipitated silica, fumed silica and fired silica having a specific surface area of at least 50 $m^2/g$, especially 50 to 400 $m^2/g$ as measured by a BET method, and ground quartz and diatomaceous earth having a mean particle size of up to 50 μm, especially 0.1 to 20 μm.

The silica fine powder may be used as such. Alternatively it may be converted into hydrophobic silica fine powder prior to use by surface treating it with organic silicon compounds such as hexamethyldisilazane, trimethylchlorosilane, and polymethylsiloxane.

The amount of silica fine powder (C) blended is 1 to 100 parts, especially 2 to 50 parts by weight per 100 parts by weight of components (A) and (B) combined. Less than 1 part of silica on this basis is ineffective for improving mechanical strength whereas more than 100 parts of silica would restrain loading of large amounts of spherical fused silica as component (D) to be described below.

In the silicone rubber composition of the invention, a spherical fused silica filler is blended as component (D). It is typically a mixture of (a) spherical fused silica having a mean particle size of 7 to 40 μm and (b) spherical fused silica having a mean particle size of 0.1 to 6.5 μm. Mixing silicas (a) and (b) gives a mixture having at least two mean particle sizes, that is, a particle size distribution with at least two peaks. When loaded in a silicone rubber composition to a high density, the mixture ensures smooth flow for the composition. In addition, the loaded composition cures into a silicone rubber product having a low shrinkage or expansion factor, minimal water absorption, and improved electrical insulating properties. The spherical fused silica mix filler is essential for the silicone rubber composition of the invention because when the cured silicone rubber is used in an application where improvements in electrical properties are needed, the spherical fused silica mix filler contributes to such improvements.

The spherical fused silica (a) should have a mean particle size of 7 to 40 μm, especially 9 to 30 μm and spherical fused silica (b) have a mean particle size of 0.1 to 6.5 μm, especially 0.2 to 5 μm. The mean particle size may be measured as a weight average value by laser diffraction method, centrifuge method and the like. Component (a) contributes to flow whereas blending of component (b) enables highest loading. The spherical fused silica is commercially available in the trade name of Adma Fine from Admatechs Co., for example.

Components (a) and (b) are mixed such that the mixture may consist of 50 to 95%, especially 60 to 90% by weight of component (a) and 50 to 5%, especially 40 to 10% by weight of component (b). Using at least two spherical fused silicas having different mean particle sizes is essential for the inventive composition to achieve the desired results.

In both components (a) and (b), the content of silica particles having a mean particle size of more than 75 μm should preferably be less than 2% by weight based on the total weight of the spherical fused silica filler.

The spherical fused silicas (a) and (b) are preferably surface treated prior to use. The silicas are treated with surface treating agents such as silane and titanate coupling agents, dimethylpolysiloxane oil and dimethylhydrogenpolysiloxane oil.

Examples of the silane coupling agent include hexamethyldisilazane, divinyltetramethyldisilazane, diphenyltetramethyldisilazane, vinyltriethoxysilane, vinyltrimethoxysilane, trimethylethoxysilane, vinyltris-(methoxyethoxy)silane, trimethylchlorosilane, trimethylaminosilane, glycidoxypropyltrimethoxysilane, glycidoxypropylmethyldiethoxysilane, (epoxycyclohexyl) ethyltrimethoxysilane, methacryloxypropyltrimethoxysilane, methacryloxypropyltriethoxysilane, dimethyldimethoxysilane, divinyldimethoxysilane, and chloropropyltrimethoxysilane.

Examples of the titanate coupling agent include tetra-i-propyl titanate, tetra-n-butyl titanate, butyl titanate dimer, tetrastearyl titanate, triethanolamine titanate, titanium acetylacetonate, titanium ethylacetoacetate, titanium lactate, octylene glycol titanate, isopropyltristearoyl titanate, isopropyltridodecylbenzenesulfonyl titanate, isopropyltris (dioctylpyrophosphate) titanate, bis(dioctylpyrophosphate) oxyacetate titanate, and bis(dioctylpyrophosphate)ethylene titanate.

The dimethylpolysiloxane oil is preferably a cyclic or chain-like non-functional one having a viscosity of 0.65 to 100 centipoise.

The dimethylhydrogenpolysiloxane oil may have a linear, branched, cyclic or network molecular structure. A preferred one is of the following general formula (3).

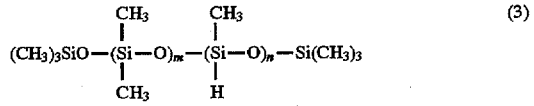

(3)

In formula (3), letter m is a number of 0 to 50, preferably 0 to 25 and n is a number of 1 to 50, preferably 2 to 25. A polysiloxane of formula (3) wherein m>50 is too viscous and difficult to treat therewith. Similarly a polysiloxane of formula (3) wherein n>50 is too viscous and unlikely to wet the surface of silica particles. Usually 100 parts by weight of spherical fused silica is treated with 1 to 50 parts, especially 5 to 30 parts by weight of the treating agent. Less than 1 part of the treating agent is ineffective whereas more than 50 parts of the treating agent is wasteful and uneconomical.

Any of well-known methods may be used for the surface treatment of spherical fused silica. For example, spherical fused silica is directly surface treated in advance. Alternatively, spherical fused silica is surface treated while milling with the remaining components. The direct pretreatment is preferred. For example, a closed mechanical milling equipment under atmospheric pressure or a fluidized bed is charged with spherical fused silica and the treating agent, which are mixed at room temperature or elevated temperature optionally in the presence of an inert gas. If desired, the surface treatment may be promoted by a catalyst. The milling step is followed by drying to complete surface treatment.

The amount of spherical fused silica filler blended as component (D) is 100 to 900 parts, especially 150 to 700 parts by weight per 100 parts by weight of components (A) and (B) combined. Less than 100 parts of spherical fused silica filler (D) would fail to clear the intended coefficient of linear shrinkage and electrical properties whereas more than 900 parts of spherical fused silica filler (D) would increase the viscosity of the composition so that filler loading is difficult and the composition is less workable.

In addition to the above-mentioned components (A) to (D), various additives may be added to the silicone rubber composition of the invention depending on its intended application. Exemplary additives are metal oxides such as titanium oxide, cobalt oxide, iron oxide and cerium oxide, metal hydroxides such as aluminum hydroxide, and carbon. Also pigments, heat resistance modifiers, flame retardants, plasticizers, reaction control agents, etc. may be added insofar as they are not detrimental to the desired properties. These optional components are added in conventional amounts insofar as the objects of the invention are not impaired.

The silicone rubber composition of the invention can be prepared simply by uniformly mixing components (A) to (D) and other optional components at room temperature. If desired, the composition is prepared by previously heat treating components (A), (C) and (D) in a planetary mixer or kneader at a temperature of 100° to 200° C. for 2 to 4 hours, and thereafter mixing component (B). The composition is then molded and cured. A suitable molding technique may be selected depending on the viscosity of a particular composition. A choice may be made among casting, compression molding, injection molding, extrusion molding and transfer molding. Other curing conditions usually include a temperature of 80° to 200° C. and a time of 3 minutes to 3 hours although the composition is curable at room temperature.

The thus cured silicone rubber has excellent weather resistance, water repellency and electrical insulation and is improved in heat resistance, electrical properties and shrinkage. It is thus suitable for use as electrical insulators such as insulators utilized with power distribution and transmission lines.

There has been described a silicone rubber composition loaded with large amounts of spherical fused silicas. The silicone rubber composition affords efficient loading and high fluidity and cures into a silicone rubber product having low coefficients of shrinkage and expansion, low water absorption, improved weather resistance and water repellency to withstand service conditions where it is exposed to a seriously contaminated atmosphere, salt damage and severe weather. The cured silicone rubber is thus suitable for use as electrical insulators which must withstand severe weather conditions over a long term, for example, as insulators utilized with power distribution and transmission lines.

EXAMPLE

Examples of the present invention are given below by way of illustration and not by way of limitation. All parts are by weight.

The spherical fused silicas used in Examples within the scope of the invention and ground crystal quartz used in Comparative Examples had a mean particle size as reported in Table 1. The mean particle size was measured as a weight average value by laser diffraction method using Granulometer 920 (manufactured by CILAS ALCATEL, France).

TABLE 1

|  | Designation | Mean particle size (μm) |
|---|---|---|
| Spherical fused silica | (i) | 30 |
|  | (ii) | 3 |
|  | (iii) | 0.5 |
| Ground crystal quartz | (iv) | 30 |
|  | (v) | 1.5 |

Examples 1 & 2

A base compound was prepared by blending a dimethylpolysiloxane (A-1) blocked with a dimethylvinylsiloxy group at each end and having a viscosity of 5,000 centipoise at 25° C. as an organopolysiloxane (A) of the addition reaction curing type with wet silica having a BET specific surface area of 180 m²/g (Nipsil LP by Nippon Silica Industry K.K.) as silica fine powder (C) and spherical fused silicas reported in Table 1 as filler (D) in a proportion as shown in Table 2, agitating and mixing them in a planetary mixer at 150° C. for 2 hours, and then cooling to room temperature (25° C.).

To the base compound were added methylhydrogenpolysiloxane of formula (4) shown below and a 1% 2-ethylhexanol solution of chloroplatinic acid as curing agent (B) and ethynyl cyclohexanol as a reaction control agent. They were uniformly mixed to form a silicone rubber composition. The composition was molded and heat cured at 120° C. for 10 minutes into a silicone rubber sheet of 130 mm×130 mm×2 mm thick.

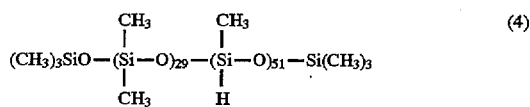

(4)

Example 3

A base compound was prepared by blending a dimethylpolysiloxane (A-2) blocked with a trivinylsiloxy group at each end and having a viscosity of 30,000 centipoise at 25° C. as an organopolysiloxane (A) of the organic peroxide curing type with the same components (C) and (D) as in Example 1 in a proportion as shown in Table 2, agitating and mixing them in a planetary mixer at 150° C. for 2 hours, and then cooling to room temperature.

To the base compound was added dicumyl peroxide as curing agent (B) in an amount as shown in Table 2. They were mixed at room temperature until uniform, obtaining a silicone rubber composition. The composition was molded and heat cured at 165° C. for 10 minutes and post cured at 200° C. for 4 hours into a silicone rubber sheet of 130 mm×130 mm×2 mm thick.

Comparative Examples 1-3

Silicone rubber sheets were obtained as in Example 1 except that the components shown in Table 2 were blended.

The silicone rubber compositions prepared in Examples and Comparative Examples were examined for filler loading and viscosity by the following tests. The results are shown in Table 2. The silicone rubber sheets of Example 1 and Comparative Example 1 were measured for a coefficient of linear shrinkage and water absorption by the following methods. These compositions were also measured for spiral flow. The results are shown in Table 3.

Filler loading

The composition was visually observed during blending whether or not it became a viscous consistent compound. The composition was rated "OK" when it became a viscous consistent compound and "Poor" when it did not become a viscous consistent compound.

Coefficient of linear shrinkage

The composition was placed in a mold of 130 mm×130 mm×2 mm deep, vulcanized at 120° C. for 10 minutes, and allowed to cool down to room temperature. The length of two line segments connecting the intermediate points of opposed sides was measured up to a scale unit of 0.1 mm. An average was assumed to be the length of one side of the vulcanized or cured specimen. A coefficient of linear shrinkage was calculated according to {(length of one side of mold)—(length of one side of cured specimen)}/(length of one side of mold)×100%.

Water absorption

The initial weight of a sheet of 5 mm×5 mm×2 mm thick was measured. The sheet was immersed in water for 48 hours and measured for weight again. A water absorption was calculated according to {(post-immersion weight)—(initial weight)}/(initial weight)×100%.

Spiral flow

Using a mold according to the EMMI standard, a spiral flow was measured at 120° C. and 100 kgf/cm².

As is evident from Table 2, silicone rubber compositions of the invention are improved in filler loading and fluidity, permit the silica filler to be loaded to the highest density, and are vulcanized into silicone rubber sheets having a low coefficient of linear expansion and water absorption. In contrast, silicone rubber compositions using ground crystal quartz instead of spherical fused silica as component (D) (Comparative Examples 2 and 3) and a silicone rubber composition using a spherical fused silica having a single mean particle size peak (Comparative Example 1) are too viscous. In particular, the composition of Comparative Example 2 was inferior in filler loading.

As is evident from Table 3, the silicone rubber composition of the invention has an improved coefficient of linear expansion and water absorption and a greater spiral flow indicating improved fluidity.

Japanese Patent Application No. 7-299070 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition comprising
    (A) an organopolysiloxane curable with an organic peroxide or by addition reaction curing,
    (B) a sufficient amount to cure organopolysiloxane (A) of a curing agent, the amount of components (A) and (B) combined being 100 parts by weight,
    (C) 1 to 100 parts by weight of a non-spherical silica fine powder, and
    (D) 100 to 900 parts by weight of a spherical fused silica filler comprising (a) 50 to 95% by weight of spherical fused silica having a mean particle size of 7 to 40 µm and (b) 50 to 5% by weight of spherical fused silica having a mean particle size of 0.1 to 6.5 µm.

2. The silicone rubber composition of claim 1 wherein the organopolysiloxane is curable with an organic peroxide, the organopolysiloxane contains on the average at least two alkenyl groups in a molecule and the organopolysiloxane is of the following average compositional formula (1):

TABLE 2

| Component (pbw) | | E1 | E2 | E3 | CE1 | CE2 | CE3 |
|---|---|---|---|---|---|---|---|
| (A) Organopoly siloxane | (A-1) | 94 | 94 | | 94 | 94 | 94 |
| | (A-2) | | | 100 | | | |
| (B) Curing agent | Organic peroxide | | | 0.6 | | | |
| | Organohydrogen-polysiloxane | 6 | 6 | | 6 | 6 | 6 |
| | Platinum catalyst | 0.2 | 0.2 | | 0.2 | 0.2 | 0.2 |
| | Reaction controller | 0.1 | 0.1 | | 0.1 | 0.1 | 0.1 |
| (C) Wet silica | | 5 | 5 | 5 | 5 | 5 | 5 |
| (D) Silica filler | Spherical fused silica (i) | 400 | 370 | 400 | 500 | | |
| | Spherical fused silica (ii) | | 75 | | | | |
| | Spherical fused silica (iii) | 100 | 55 | 100 | | | |
| | Ground crystal quartz (iv) | | | | | 500 | 400 |
| | Ground crystal quartz (v) | | | | | | 100 |
| Filler loading | | OK | OK | OK | OK | Poor | Poor |
| Composition viscosity (cps, 25° C.) | | 20000 | 10000 | 30000 | 50000 | unmeasurable | 120000 |

TABLE 3

| | Example 1 | Comparative Example 1 |
|---|---|---|
| Coefficient of linear expansion (%) | 0.70 | 1.01 |
| Water absorption (%) | +0.001 | +0.05 |
| Spiral flow (cm) | 17 | 11 |

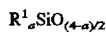 (1)

wherein $R^1$ is independently selected from substituted or unsubstituted monovalent hydrocarbon groups of 1 to 10 carbon atoms attached to a silicon atom, 0.01 to 20 mol % of the entire monovalent hydrocarbon groups represented by $R^1$ is an alkenyl group, and letter a is a positive number of 1.6 to 2.4 and curing agent (B) is a catalytic amount of an organic peroxide.

3. The silicone rubber composition of claim 1 wherein the organopolysiloxane is curable by addition reaction curing, the organopolysiloxane contains on the average at least two alkenyl groups in a molecule and the organopolysiloxane is of the following average compositional formula (1):

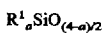 (1)

wherein $R^1$ is independently selected from substituted or unsubstituted monovalent hydrocarbon groups of 1 to 10 carbon atoms attached to a silicon atom, 0.01 to 20 mol % of the entire monovalent hydrocarbon groups represented by $R^1$ is an alkenyl group, and letter a is a positive number of 1.6 to 2.4 and curing agent (B) comprises (B-1) a liquid at room temperature organohydrogenpolysiloxane of the following average compositional formula (2):

 (2)

wherein $R^2$ is independently selected from substituted or unsubstituted monovalent hydrocarbon groups of 1 to 10 carbon atoms attached to a silicon atom, 0.01 to 20 mol % of the entire monovalent hydrocarbon groups represented by $R^1$ is an alkenyl group, letters b and c are numbers satisfying $1 \leq b \leq 2.1$, $0.01 \leq c \leq 1$, and $1.5 \leq b+c \leq 2.8$ and (B-2) a catalytic amount of an addition reaction catalyst.

4. The silicone rubber composition of claim 2, wherein $R^1$ is independently selected from an alkyl, cycloalkyl, alkenyl, phenyl, tolyl, xylyl, benzyl or phenethyl group of 1 to 10 carbon atoms optionally substituted by halogen or cyano.

5. The silicone rubber composition of claim 3, wherein $R^1$ is independently selected from an alkyl, cycloalkyl, alkenyl, phenyl, tolyl, xylyl, benzyl or phenethyl group of 1 to 10 carbon atoms optionally substituted by halogen or cyano.

6. The silicone rubber composition of claim 2, wherein the organopolysiloxane has at least two alkenyl groups attached to silicon atoms at both ends of the molecular chain.

7. The silicone rubber composition of claim 3, wherein the organopolysiloxane has at least two alkenyl groups attached to silicon atoms at both ends of the molecular chain.

8. The silicone rubber composition of claim 1, wherein the organopolysiloxane has a viscosity of 100 to 1,000,000 centipoise at 25° C.

9. The silicone rubber composition of claim 1, wherein the organopolysiloxane has a viscosity of 500 to 500,000 centipoise at 25° C.

10. The silicone rubber composition of claim 3, wherein $R^2$ is independently selected from an alkyl, cycloalkyl, phenyl, tolyl, xylyl, benzyl or phenethyl group of 1 to 10 carbon atoms optionally substituted by halogen or cyano.

11. The silicone rubber composition of claim 1, wherein the non-spherical silica fine powder is precipitated silica, fumed silica or fired silica having a specific surface area of at least 50 m²/g or ground quartz or diatomaceous earth having a mean particle size of up to 50 μm.

12. The silicone rubber composition of claim 1, wherein the non-spherical silica fine powder is a hydrophobic silica fine powder surface treated by an organic silicon compound.

13. The silicone rubber composition of claim 1, wherein spherical fused silica filler (a) has mean particle size of 9 to 30 μm and spherical fused silica filler (b) has a mean particle size of 0.2 to 5 μm.

14. The silicone rubber composition of claim 1, wherein the spherical fused silica filler (D) contains 50 to 95% by weight of filler (a) and 50 to 5% by weight of filler (b).

15. The silicone rubber composition of claim 1, wherein one or both of spherical fused silica fillers (a) and (b) are surface treated with silane or titanate coupling agents, dimethylpolysiloxane oil or dimethylhydrogenpolysiloxane oil.

* * * * *